US012586546B2

(12) United States Patent
Ma et al.

(10) Patent No.: US 12,586,546 B2
(45) Date of Patent: Mar. 24, 2026

(54) DISPLAY PANEL INCLUDING PRE-CHARGING CONTROL MODULE AND DISPLAY DEVICE

(71) Applicant: Wuhan China Star Optoelectronics Technology Co., Ltd., Wuhan (CN)

(72) Inventors: Changwen Ma, Wuhan (CN); Zhou Zhang, Wuhan (CN); Mingyue Li, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 18/254,872

(22) PCT Filed: Apr. 18, 2023

(86) PCT No.: PCT/CN2023/089018
§ 371 (c)(1),
(2) Date: May 29, 2023

(87) PCT Pub. No.: WO2024/103625
PCT Pub. Date: May 23, 2024

(65) Prior Publication Data

US 2025/0266011 A1 Aug. 21, 2025

(30) Foreign Application Priority Data

Nov. 15, 2022 (CN) ......................... 202211430715.1

(51) Int. Cl.
*G09G 3/36* (2006.01)

(52) U.S. Cl.
CPC ............. *G09G 3/3677* (2013.01); *G09G 3/36* (2013.01); *G09G 2310/0251* (2013.01);
(Continued)

(58) Field of Classification Search
CPC ......... G09G 3/3677; G09G 2310/0251; G09G 2310/08; G09G 2320/0242; G09G 2320/0252; G09G 3/36
See application file for complete search history.

(56) References Cited

U.S. PATENT DOCUMENTS

2007/0057628 A1 3/2007 Kim
2008/0024404 A1 * 1/2008 Tanaka ................ G09G 3/3648 345/87

(Continued)

FOREIGN PATENT DOCUMENTS

CN 1710635 A 12/2005
CN 1744190 A 3/2006

(Continued)

OTHER PUBLICATIONS

International Search Report in International application No. PCT/CN2023/089018, mailed on Sep. 12, 2023.

(Continued)

*Primary Examiner* — Adam J Snyder
(74) *Attorney, Agent, or Firm* — Nathan & Associates Patent Agents Ltd.; Menachem Nathan

(57) ABSTRACT

The embodiments of the present application provide a display panel and a display device. The display panel includes data lines, pixel units, a plurality of gate driving units connected in cascade. At least one gate driving unit includes a pre-charging control module electrically connected with a pre-charging control signal terminal and a scanning signal output terminal of the present stage. The pre-charging control module outputs the pre-charging control signals to the scanning signal output terminal of the present stage, and the data lines output the pre-charging control signals to the corresponding pixel units.

14 Claims, 8 Drawing Sheets

(52) U.S. Cl.
CPC . *G09G 2310/08* (2013.01); *G09G 2320/0242* (2013.01); *G09G 2320/0252* (2013.01)

(56) References Cited

U.S. PATENT DOCUMENTS

| | | | | |
|---|---|---|---|---|
| 2013/0257917 | A1* | 10/2013 | Peng | G09G 3/20<br>345/690 |
| 2014/0160184 | A1* | 6/2014 | Wang | G09G 3/3666<br>345/691 |

FOREIGN PATENT DOCUMENTS

| | | | | |
|---|---|---|---|---|
| CN | 103000119 | A | 3/2013 | |
| CN | 104810001 | A | 7/2015 | |
| CN | 106328074 | A | 1/2017 | |
| CN | 109493778 | A | 3/2019 | |
| CN | 109523971 | A | 3/2019 | |
| CN | 109584825 | A | 4/2019 | |
| CN | 111883074 | A | 11/2020 | |
| CN | 115719585 | A | 2/2023 | |
| WO | WO-2009028353 | A1 * | 3/2009 | G11C 19/28 |

OTHER PUBLICATIONS

Written Opinion of the International Search Authority in International application No. PCT/CN2023/089018, mailed on Sep. 12, 2023.

Chinese Office Action issued in corresponding Chinese Patent Application No. 202211430715.1 dated Apr. 8, 2025, pp. 1-7.

* cited by examiner

DISPLAY PANEL INCLUDING PRE-CHARGING CONTROL MODULE AND DISPLAY DEVICE

CROSS-REFERENCE TO RELATED APPLICATIONS

This application is a national stage of International Application No. PCT/CN2023/089018, filed on Apr. 18, 2023, which claims priority to Chinese Patent Application No. 202211430715.1, filed on Nov. 15, 2022. Both of the aforementioned applications are hereby incorporated by reference in their entireties.

TECHNICAL FIELD

The present application relates to a technical field of a display, in particular to a display panel and a display device.

BACKGROUND

Liquid crystal display (LCD) devices have been widely used in modern society. Currently, by equipping a timing control module, a cell, and a backlight module, image display is achieved in the LCD panel. The backlight module includes a LED array. In the LCD panel, different color effects are achieved by adjusting the brightness of the LEDs to control light passing through color filters. However, the existence of the color filters in the cell increases the cost and decreases the light efficiency. The conventional field sequence display method of color-mixing in time display images by turning on R/G/B LEDs one field at a time with color filters unneeded, therefore, the image displayed with color-mixing in time is realized. This method can achieve a same display effect of color image as that of color-mixing in space. Due to the limit of the refresh frequency of the LCD panels, the conventional field sequence display method will cause a phenomenon of color splitting, thus affecting the visual experience.

FIG. 1 is a schematic diagram of driving timing of a conventional display device. The backlight of the conventional field sequence display panel controls the global image displayed at different times to realize the image display of field sequence. However, since the image display in the conventional field sequence display panel is not controlled at different regions, when the grayscale values between adjacent sub-frame images change greatly, a phenomenon of abnormal color-mixing of image display caused by long response time of the liquid crystal appears. Therefore, a problem on how to control the image display at different regions, to reduce the response time of liquid crystal and to improve the abnormal color-mixing of image displayed with field sequence display method becomes urgent to be solved.

SUMMARY OF THE INVENTION

Technical Problem

An object of the embodiments of the present application is to reduce the response time of the liquid crystal and to improve the problem of abnormal color-mixing of image displayed with field sequence display method by providing a pre-charging control module to pre-charge pixel units corresponding to at least one gate driving unit before images displaying.

Technical Solution

The embodiments of the present application provide a display panel comprising a plurality of data lines, a plurality of pixel units electrically connected with the data lines and a plurality of gate driving units connected in cascade; wherein at least one of the gate driving units comprises a pre-charging control module, electrically connected with a pre-charging control signal terminal and a scanning signal output terminal of the present stage, to output pre-charging control signals to the scanning signal output terminal of the present stage; and the data lines are configured to output pre-charging control signals to the corresponding pixel units.

Optionally, in some embodiments of the present application, the plurality of the gate driving units comprise a plurality of gate driving unit groups, each of the gate driving units comprising a pre-charging control module, and a plurality of the pre-charging control modules disposed in a gate driving unit group are electrically connected with a same pre-charging control signal terminal.

Optionally, in some embodiments of the present application, a plurality of the pre-charging control modules disposed in different gate driving unit groups are simultaneously turned on under a control of the pre-charging control signal outputted from the pre-charging control signal terminal.

Optionally, in some embodiments of the present application, a plurality of the pre-charging control modules disposed in different gate driving unit groups are sequentially turned on under the control of a plurality of the pre-charging control signals outputted from a plurality of the pre-charging control signal terminals.

Optionally, in some embodiments of the present application, a plurality of the pre-charging control modules disposed in at least two gate driving unit groups arranged at intervals are simultaneously turned on under the control of the pre-charging control signal outputted from the pre-charging control signal terminal, or a plurality of the pre-charging control modules disposed in at least two gate driving unit groups arranged at intervals are sequentially turned on under the control of the pre-charging control signals outputted from the pre-charging control signal terminals.

Optionally, in some embodiments of the present application, the pixel units corresponding to different gate driving unit groups are pre-charged in the same time period.

Optionally, in some embodiments of the present application, the gate driving unit further comprises a driving module, electrically connected with the cascade control signal terminal, the pre-charging control module and the scanning signal output terminal of the present stage; the driving module is configured to output driving signals to the scanning signal output terminal of the present stage and the gate driving unit of the subsequent stage after the data lines complete the output of the pre-charging voltage, and the data lines are configured to output the data voltages to the corresponding pixel units.

Optionally, in some embodiments of the present application, a peak value of the pre-charging voltages ranges between 50% and 90% of a peak value of the data voltages.

Optionally, in some embodiments of the present application, the display panel further comprises a judging unit electrically connected with the pre-charging control module and the data lines; the judging unit is configured to control the pre-charging control module to turn off when the difference value of the data voltages outputted from the data lines to the pixel units corresponding to the adjacent two gate driving unit groups is smaller than or equal to a predetermined threshold value, and configured to control the pre-charging control module to turn on when the difference value of the data voltages outputted from the data lines to the pixel units corresponding to the adjacent two gate driving unit groups is greater than the predetermined threshold value.

Optionally, in some embodiments of the present application, the plurality of the gate driving units connected in cascade comprise N gate driving unit groups; where X≤K≤X*N, and K≤T*30%, X is a scanning time of a row of pixel units P, K is a total pre-charging time corresponding to a plurality of the gate driving unit groups, T is a display time of a frame of image, N is a positive integer and X, K and T are positive numbers.

Optionally, in some embodiments of the present application, further comprising a plurality of sub-backlight regions disposed along the direction of the scanning line and disposed corresponding to the gate driving unit group, the pre-charging voltages for the pixel units corresponding to the sub-backlight regions are negatively correlated with the brightness of the sub-backlight regions.

The embodiments of the present application also provide a display device comprising a display panel and a driving circuit disposed on the display panel, wherein the display panel comprises a plurality of data lines, a plurality of pixel units electrically connected with the data lines, and a plurality of gate driving units connected in cascade; wherein at least one of the gate driving units comprises a pre-charging control module, electrically connected with a pre-charging control signal terminal and a scanning signal output terminal of the present stage, to output pre-charging control signals to the scanning signal output terminal of the present stage; and the data lines are configured to output pre-charging control signals to the corresponding pixel units.

Optionally, in some embodiments of the present application, the plurality of the gate driving units comprise a plurality of gate driving unit groups, each of the gate driving units comprising a pre-charging control module, and a plurality of the pre-charging control modules disposed in a gate driving unit group are electrically connected with a same pre-charging control signal terminal.

Optionally, in some embodiments of the present application, a plurality of the pre-charging control modules disposed in different gate driving unit groups are simultaneously turned on under a control of the pre-charging control signal outputted from the pre-charging control signal terminal.

Optionally, in some embodiments of the present application, a plurality of the pre-charging control modules disposed in different gate driving unit groups are sequentially turned on under the control of a plurality of the pre-charging control signals outputted from a plurality of the pre-charging control signal terminals.

Optionally, in some embodiments of the present application, a plurality of the pre-charging control modules disposed in at least two gate driving unit groups arranged at intervals are simultaneously turned on under the control of the pre-charging control signal outputted from the pre-charging control signal terminal, or a plurality of the pre-charging control modules disposed in at least two gate driving unit groups arranged at intervals are sequentially turned on under the control of the pre-charging control signals outputted from the pre-charging control signal terminals.

Optionally, in some embodiments of the present application, the pixel units corresponding to different gate driving unit groups are pre-charged in the same time period.

Optionally, in some embodiments of the present application, the gate driving unit further comprises a driving module, electrically connected with the cascade control signal terminal, the pre-charging control module and the scanning signal output terminal of the present stage; the driving module is configured to output driving signals to the scanning signal output terminal of the present stage and the gate driving unit of the subsequent stage after the data lines complete the output of the pre-charging voltage, and the data lines are configured to output the data voltages to the corresponding pixel units.

Optionally, in some embodiments of the present application, a peak value of the pre-charging voltages ranges between 50% and 90% of a peak value of the data voltages.

Optionally, in some embodiments of the present application, the display panel further comprises a judging unit electrically connected with the pre-charging control module and the data lines; the judging unit is configured to control the pre-charging control module to turn off when the difference value of the data voltages outputted from the data lines to the pixel units corresponding to the adjacent two gate driving unit groups is smaller than or equal to a predetermined threshold value, and configured to control the pre-charging control module to turn on when the difference value of the data voltages outputted from the data lines to the pixel units corresponding to the adjacent two gate driving unit groups is greater than the predetermined threshold value.

Advantageous Effects

In the display panel and the display device provided in the embodiments of the present application, the display panel includes a plurality of data lines, a plurality of pixel units and a plurality of gate driving units connected in cascade, a plurality of the pixel units are electrically connected with the data lines, at least one of the gate driving units includes a pre-charging control module, the pre-charging control module is electrically connected with the pre-charging control signal terminal and the scanning signal output terminal of the present stage, the pre-charging control module outputs the pre-charging control signal to the scanning signal output terminal of the present stage, and the data lines output pre-charging control signals to the corresponding pixel units. By providing the pre-charging control module to output the pre-charging control signal to the scanning signal output terminal of the present stage, pre-charging pixel unit corresponding to at least one gate driving unit before images displaying can be realized, thereby reducing the response time of the liquid crystal and improving the problem of abnormal color-mixing of image displayed with field sequence display method.

BRIEF DESCRIPTION OF THE DRAWINGS

In order to describe the technical solution provided in the embodiments of the present application more clearly, the figures used in the description of embodiments of the present application will be briefly described below. Apparently, the figures described below are only a part of figures of the embodiments of the present application, other figures can be obtained without creative efforts by those skilled in the art.

DETAILED DESCRIPTION OF THE EMBODIMENTS

Figure 1:
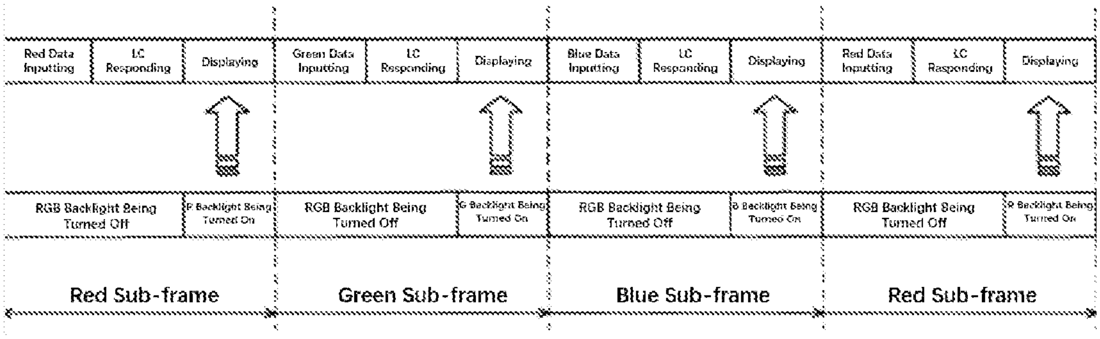
FIG. 1 is a schematic diagram of driving timing of a conventional display device.

The technical solution provided in the embodiments of the present application will be clearly and completely described in the following with reference to the figures provided in the embodiments of the present application. Apparently, the embodiments described herein are only a part of and not all of the embodiments of the present application. Based on the embodiments of the present application, other embodiments obtained by those skilled in the art without creative efforts shall fall within the protection scope of the present application.

The embodiments of the present application provide a display panel and a display device. With a pre-charging control module provided in the display panel, pre-charging for pixel units P corresponding to at least one gate driving unit before image displaying can be realized, thereby reducing the response time of liquid crystal and improving the problem of abnormal color-mixing of image displayed with field sequence display method, which will be described in detail below. It should be noted that, the order of description of the following embodiments is not a limitation to the preferred order of the protection scope of the present application. In addition, in the description of the present application, the term "including" means "including but not limited to". The terms "first", "second", "third", etc. are used only as indications for distinguishing different objects but not for describing a specific order.

Refer to FIGS. 2*a* to 4*b*, the present application provides a display panel 100 including a plurality of data lines D (1, 2, 3 . . . ), a plurality of pixel units P, and a plurality of gate driving units (GOAn−1, GOAn, GOAn+1 . . . GOA2n−1, GOA2n, GOA2n+1 . . . ) connected in cascade. A plurality of the pixel units P are electrically connected with the data lines D (1, 2, 3 . . . ). At least one gate driving unit includes a pre-charging control module 10. The pre-charging control module 10 is electrically connected with a pre-charging control signal terminal Cont and a scanning signal output terminal Gout (Goutn−1, Goutn, Goutn+1 . . . Gout2n−1, Gout2n, Gout2n+1 . . . ) of the present stage. The pre-charging control module 10 outputs pre-charging control signals Cont to the scanning signal output terminal Gout of the present stage. The data lines D (1, 2, 3 . . . ) output pre-charging control signals Cont to the corresponding pixel units P. The display panel 100 also includes a plurality of scanning lines G (1, 2, 3 . . . ), a plurality of the scanning lines G (1, 2, 3 . . . ) are electrically connected with the pixel units correspondingly.

In the display panel 100 provided in the embodiments of the present application, by providing a pre-charging control module 10 in at least one gate drive unit GOA to output the pre-charging control signals Cont to a scanning signal output terminal Gout of the present stage, and pre-charging pixel units P corresponding to at least one gate driving unit before image displaying can be realized, thereby reducing the response time of liquid crystal and improving the problem of abnormal color-mixing of image displayed with field sequence display method.

In the embodiments of the present application, the gate driving unit further includes a driving module 20 electrically connected with cascade control signal terminals CK/XCK (the gate driving unit of the first stage includes cascade control signal terminals CK/XCK/STV), a pre-charging control module 10 and a scanning signal output terminal Gout of the present stage. The driving module 20 is configured to output driving signals to the scanning signal output terminal Gout of the present stage and the gate driving unit of the subsequent stage after the data lines D (1, 2, 3 . . . ) complete the output of the pre-charging voltages. The data lines D (1, 2, 3 . . . ) output data voltages to the corresponding pixel units P. Specifically, the pre-charging control module 10 can include at least one transistor.

In the embodiments of the present application, the peak value of the pre-charging voltages ranges between 50% and 90% of the peak value of the data voltages. With this design, the difference of grayscale values between adjacent sub-frame images is minimized, thereby reducing the response time of liquid crystal shifting caused by sub-frame images switching to the largest extent, and avoiding abnormal image displayed with field sequence display method caused by color-mixing.

Figure 2A:
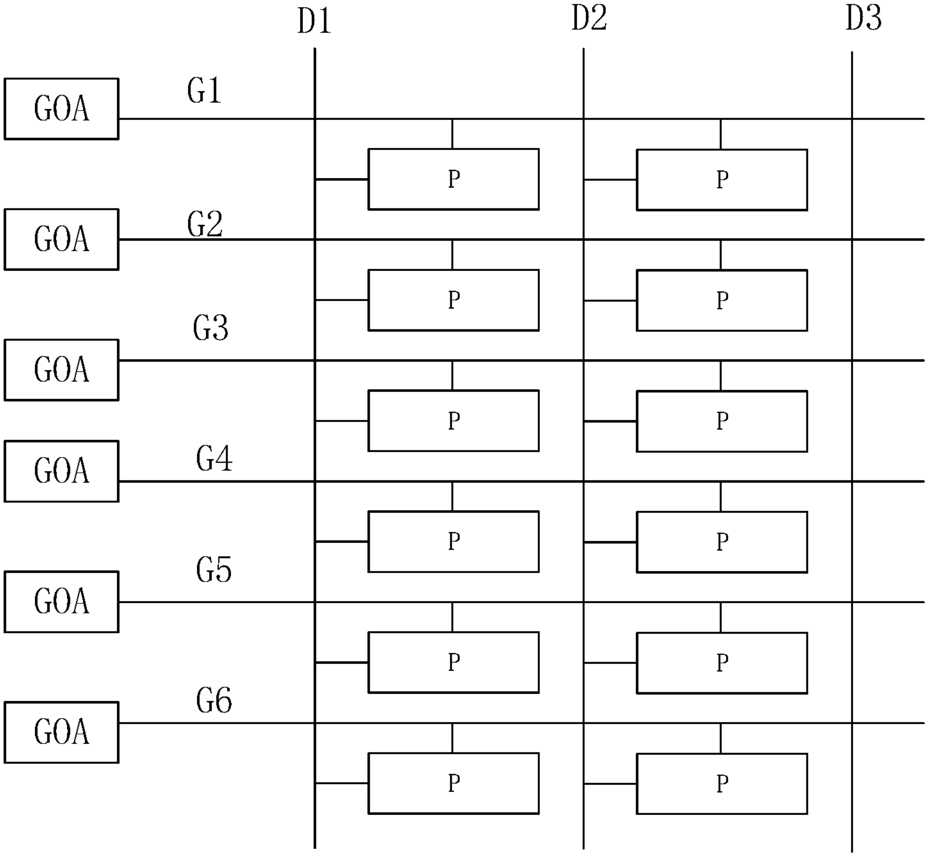
FIG. 2*a* is a structural schematic diagram of a display panel provided in the present application.
Figure 2B:
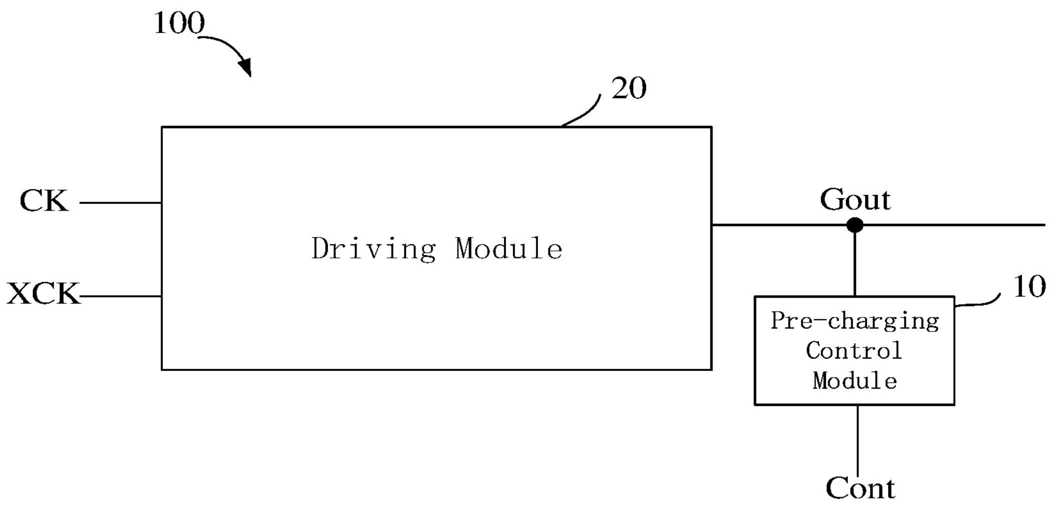
FIG. 2*b* is one of first structural diagrams of a gate driving unit of the display panel provided in the present application.
Figure 2C:
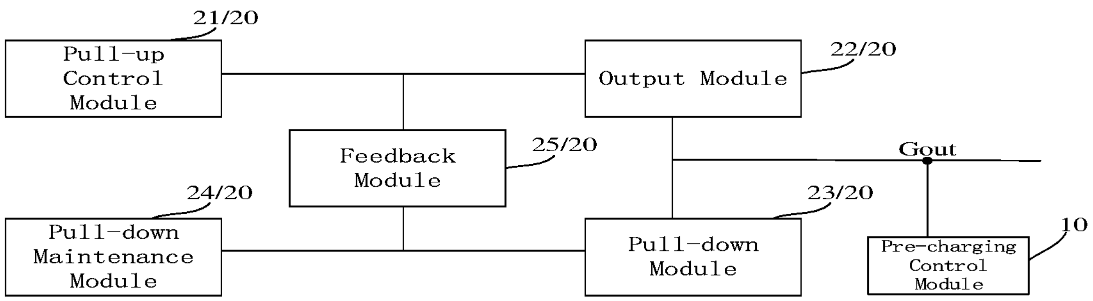
FIG. 2*c* is another first structural schematic diagram of the gate driving unit of the display panel provided in the present application.

Specifically, as shown in FIG. 2*b*, the driving module 20 includes a pull-up control module 21, an output module 22, a pull-down module 23, a pull-down maintenance module 24 and a feedback module 25. The pull-up control module 21 is electrically connected with the output module 22 and the feedback module 25 and is configured to pre-charge the point Qn. The output module 22 is electrically connected with the pull-down module 23 and the pre-charging control module 10 and is configured to output signals Gn. The pull-down module 23 is electrically connected with the pull-down maintenance module 24 and the feedback module 25 and is configured to pull down the potential of the point Qn and disconnecting the output of signals Gn. The pull-down maintenance module 24 is electrically connected with the feedback module 25 and is configured to maintain the point Qn a low potential and maintaining the disconnection of the output of signals Gn. The feedback module 25 is configured to pull up the potential of the point Qn.

Figure 3A:
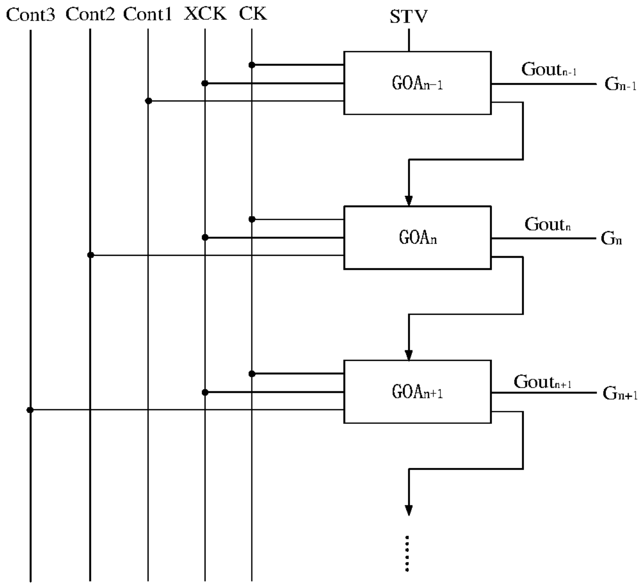
FIG. 3*a* is a structural schematic diagram of a first display panel provided in the embodiments of the present application.

Refer to FIGS. 2*b* and 3*a*, as a specific embodiment of the present application, the display panel 100 includes a plurality of gate driving units (GOAn−1, GOAn, GOAn+1 . . . GOA2n−1, GOA2n, GOA2n+1 . . . ) connected in cascade, each gate driving unit is provided with a pre-charging control module 10, and each pre-charging control module 10 is electrically connected with a corresponding pre-charging control signal terminal Cont (1, 2, 3 . . . ) and a scanning signal output terminal Gout (Goutn−1, Goutn, Goutn+1 . . . Gout2n−1, Gout2n, Gout2n+1 . . . ). The pre-charging control module 10 is configured to output the pre-charging control signals Cont to the scanning signal output terminal Gout under the control of the corresponding pre-charging control signal terminal Cont (1, 2, 3 . . . ).

In the embodiments of the present application, the display panel 100 further includes a plurality of sub-backlight regions, a plurality of the sub-backlight regions arranged along the direction of the scanning lines G (1, 2, 3 . . . ) are arranged corresponding to a gate driving unit group. The pre-charging voltages for the pixel units P corresponding to the sub-backlight regions are negatively correlated with the brightness of the sub-backlight regions. That is, the greater the brightness of the sub-backlight region, the smaller the pre-charging voltage value outputted from the data lines D (1, 2, 3 . . . ) electrically connected with the corresponding pixel units P.

Figure 3B:
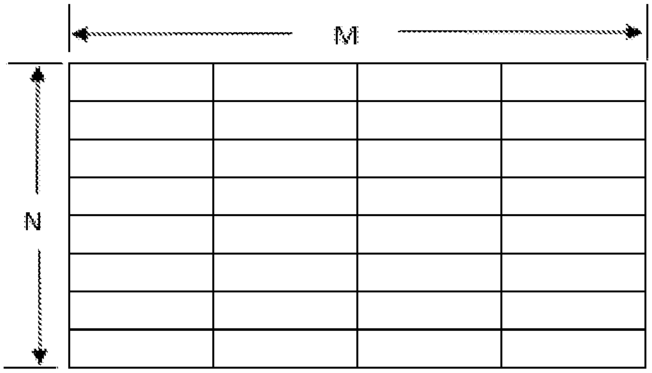
FIG. 3*b* is a schematic diagram of first sub-regions of the display panel provided in the embodiments of the present application.

Specifically, as shown in FIG. 3*b*, the display panel is provided with a R/G/B mini-LED backlight. The backlight includes M*N sub-backlight regions, that is, the backlight is divided into N sub-regions vertically and M sub-regions horizontally. Each sub-region emits backlight of three colors. Corresponding to the backlight, the display panel is divided into M*N regions, each region includes X/M pixels in the horizontal direction and Y/N pixels in the vertical direction. Before the image data of each frame are inputted, the display panel is pre-charged in N times. Y/N rows of pixels are turned on simultaneously for each time. The data pre-charged for each time are generated from the Y/N rows of the image data. The time of pre-charging each sub-region is equal to the scanning time of a row of pixels.

Figure 3C:
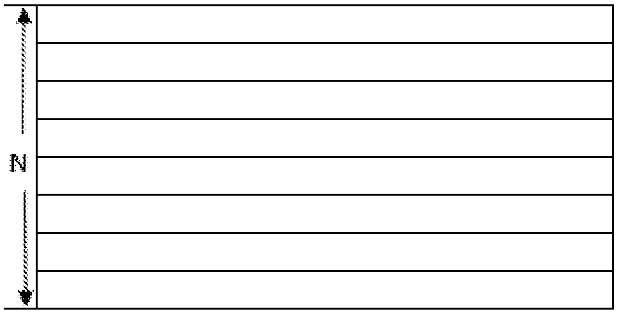
FIG. 3*c* is a schematic diagram of second sub-regions of the display panel provided in the embodiments of the present application.
Figure 3D:
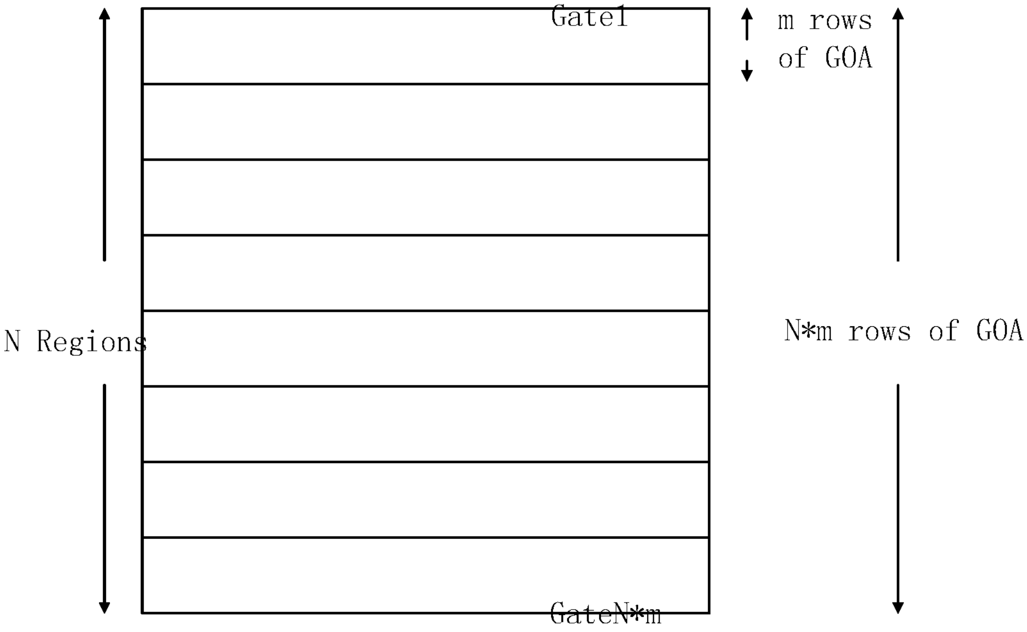
FIG. 3*d* is a schematic diagram of a gate driving unit group of the display panel provided in the embodiments of the present application.

Specifically, as shown in FIGS. 3*c* and 3*d*, the display panel is divided into N sub-regions vertically, each sub-region corresponds to M gate driving units. Before the image data of each frame are inputted, the display panel is pre-charged in N times. Y/N rows of pixels are turned on simultaneously for each time. The data pre-charged for each time are generated from the Y/N rows of image data. The time of pre-charging each sub-region is equal to the scanning time of a row of pixels.

It should be noted that, in the pre-charging phase, the backlight is turned off, or the sub-backlight region corresponding to the sub-region of the display panel under pre-charging is turned off.

Figure 3E:
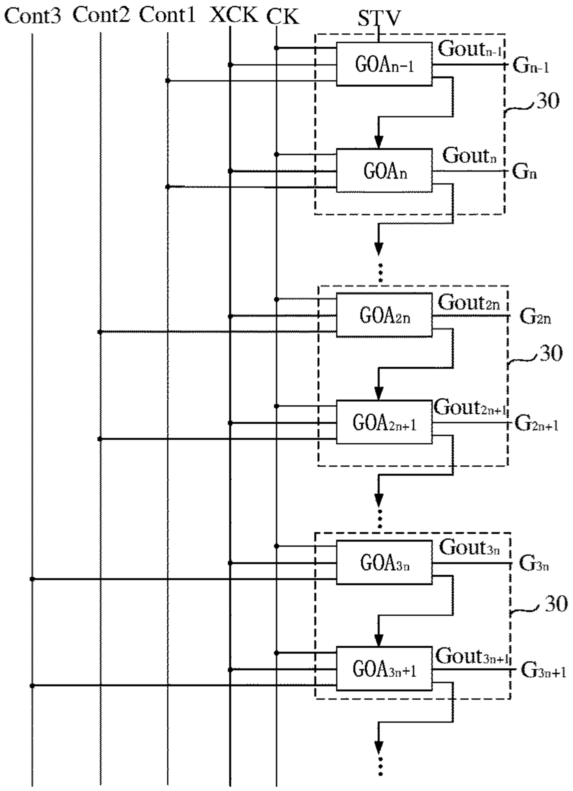
FIG. 3*e* is a structural schematic diagram of a second display panel provided in the embodiments of the present application.

In the embodiments of the present application, as shown in FIG. 3*e*, a plurality of gate driving units connected in cascade are divided into a plurality of gate driving unit groups 30. Correspondingly, the display panel is divided into a plurality of longitudinal sub-regions. Each gate driving unit includes a pre-charging control module 10. A plurality of the pre-charging control modules 10 disposed in the same gate driving unit group 30 are electrically connected with a same pre-charging control signal terminal Cont. Specifically, the gate driving unit group 30 includes at least two gate driving units. The gate driving units disposed in the same gate driving unit group 30 turn on simultaneously and output the pre-charging control signals Cont to the corresponding scanning signal output terminals Gout under the control of a pre-charging control signal Cont outputted from the same pre-charging control signal terminal Cont, and turn off simultaneously. That is, the time of a plurality of the pre-charging control modules 10 disposed in the same gate driving unit group 30 being turned on are the same, and the time of duration of the plurality of the pre-charging control modules 10 disposed in the same gate driving unit group 30 being turned on are the same. Since a plurality of the pre-charging control modules 10 disposed in the same gate driving unit group 30 are electrically connected with the same pre-charging control signal terminal Cont, the circuit layout is simplified, the wiring space is saved and the impact between signal lines is reduced.

Specifically, a plurality of the gate driving units connected in cascade are divided into N gate driving unit groups. $X \leq K \leq X*N$, and $K \leq T*30\%$, wherein X is the scanning time of a row of pixel units P, K is a total pre-charging time corresponding to the plurality of gate driving unit groups, T is a display time of a frame of image, N is a positive integer and X, K and T are positive numbers.

Figure 3F:
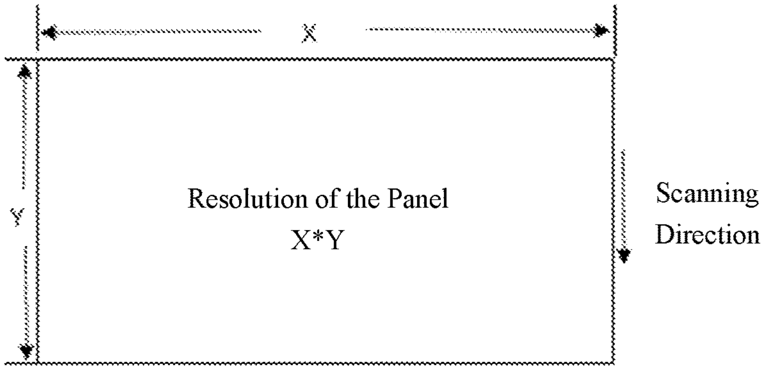
FIG. 3*f* is a schematic diagram of pixel arrangement corresponding to the display panel provided in the embodiments of the present application.

Refer to FIG. 3*f*, in the embodiments of the present application, X pixel grayscale values can be inputted at a time for pre-charging. Specifically, the grayscale values of X pixels generated from all of the image data can be the same.

X pixel grayscale values can be divided into M values corresponding to the horizontal sub-regions, and each value can be generated from all of grayscale values, such as (X/M)*(Y/N) grayscale values, of the current sub-region, and the grayscale values corresponding to sub-regions can be different.

X pixel grayscale values can be divided into X values by column, and each value is generated from the grayscale values, such as 1 column*Y/N grayscale values, of the current column.

Figure 4A:
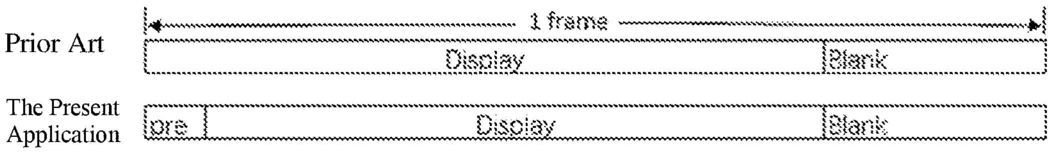
FIG. 4*a* is a comparison diagram between the driving timing of the display panel provided in the present application and the conventional driving timing.

Refer to FIG. 4*a*, compared with the conventional display method which includes an image display phase and a blanking phase, in the embodiments of the present application, a pre-charging phase pre is arranged before the image display phase display in the present application to buffer the grayscale value changes between two adjacent sub-frame images, thereby minimizing the response time of the grayscale values in the buffer time and the grayscale values of the next sub-frame image.

Figure 4B:
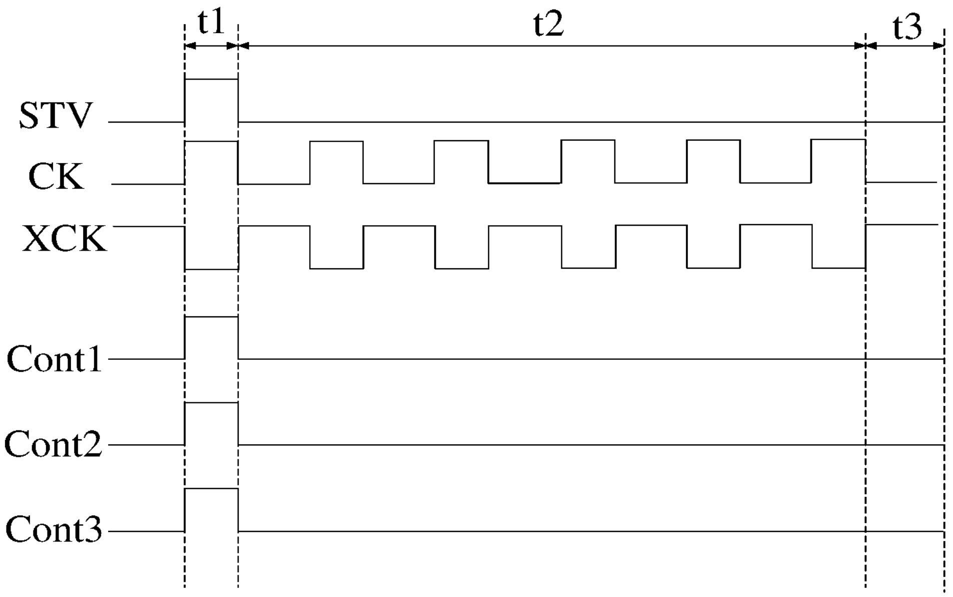
FIG. 4*b* is a first driving timing diagram of the display panel provided in the embodiments of the present application.

Specifically, as shown in FIG. 4*b*, a driving period of a frame image includes a pre-charging phase t1, a display phase t2, and a blanking phase t3. A frame image includes a plurality of sub-frame images, such as a red sub-frame image, a green sub-frame image, and a blue sub-frame image. The pre-charging phase t1 is arranged before the display phase t2. The pre-charging control module 10 is configured to output the pre-charging control signals Cont to the scanning signal output terminal Gout of the present stage in the pre-charging phase t1 to buffer the grayscale value changes between two adjacent sub-frame images, thereby minimizing the difference between the grayscale values of the previous sub-frame image and the grayscale values of the next sub-frame image, reducing the response time of liquid crystal shifting caused by sub-frame images switching and improving the display quality. In the display phase t2, the driving module 20 is turned on under the control of the cascade control signals CK/XCK/STV outputted from the cascade control signal terminal CK/XCK/STV, the pre-charging control module 10 is turned off, the driving module 20 outputs driving signals to the scanning signal output terminal Gout of the present stage and the gate driving unit of the subsequent stage, and the data lines D (1, 2, 3 . . . ) output data voltages to the corresponding pixel units P.

In the embodiments of the present application, the time of duration of a plurality of the pre-charging control modules 10 in different gate driving unit groups 30 outputting the pre-charging control signals Cont to the corresponding scanning signal output terminal Gout are the same, that is, the time of duration of a plurality of the pre-charging control modules 10 in different gate driving unit groups 30 being turned on are the same. Under the control of the pre-charging control signal Cont outputted from a same pre-charging control signal terminal Cont, a plurality of the gate driving units disposed in different gate driving unit groups 30 turn on at the same time, output pre-charging control signal Cont to the corresponding scanning signal output terminals Gout, and then turn off at the same time. Or, under the control of different pre-charging control signals Cont, a plurality of the gate driving units disposed in different gate driving unit groups 30 turn on at the same time, output the pre-charging control signals Cont to the corresponding scanning signal output terminals Gout, and turned off simultaneously.

In the embodiments of the present application, a plurality of the pre-charging control modules 10 disposed in different gate driving unit groups 30 are simultaneously turned on under the control of pre-charging control signals Cont (1, 2, 3 . . . ) outputted from the pre-charging control signal terminals Cont. A plurality of the gate driving unit groups 30 which are simultaneously turned on are continuously arranged. The time of duration of a plurality of the pre-charging control modules 10 disposed in different gate driving unit groups 30 being turned on are the same. With this design, the time of duration of the pre-charging phase t1 is the shortest and the impact on the time of duration of display phase t2 is the weakest, thereby reducing the response time of liquid crystal and ensuring the display time, and further improving the display quality.

In the embodiments of the present application, the display panel further includes a plurality of the scanning lines G (1, 2, 3 . . . ). A plurality of the scanning lines G (1, 2, 3 . . . ) are electrically connected with a plurality of the gate driving units in one-to-one correspondence. The time of duration of the pre-charging control module 10 disposed in each of the gate driving units being turned on is equal to the scanning time of the scanning lines G (1, 2, 3 . . . ) electrically connected with gate driving units. With this design, the time at which the pre-charging control module 10 outputs the pre-charging control signals Cont and the scanning time of the scanning lines G (1, 2, 3 . . . ) are consistent, thereby avoiding the impact of too long pre-charging time on the stability of the display device, and also avoiding the abnormal image display such as color shift due to insufficient pre-charging time.

Figure 5A:
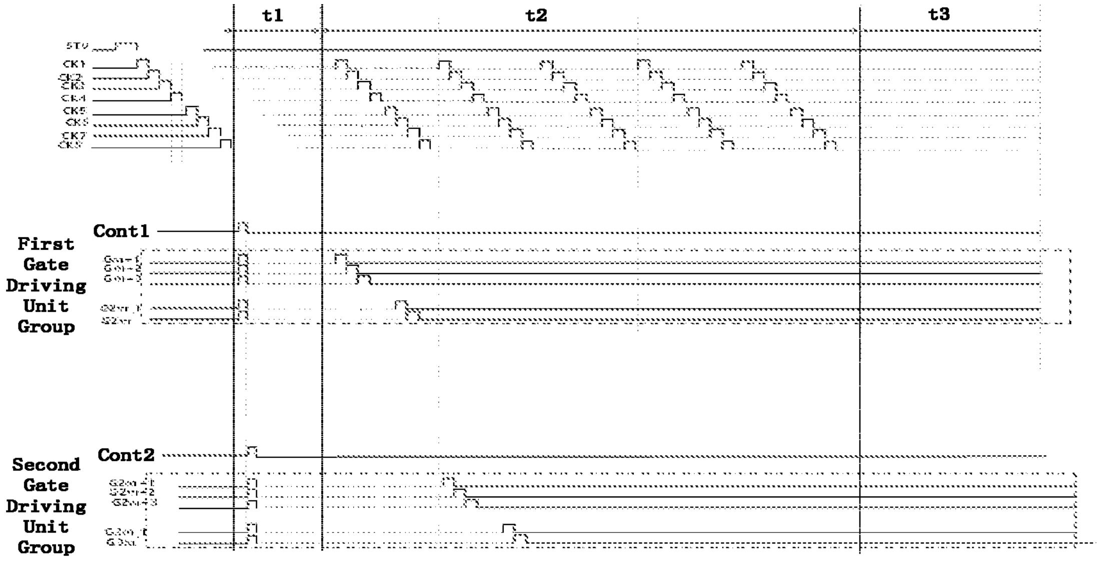
FIG. 5*a* is one of second driving timing diagram of the display panel provided in the embodiments of the present application.
Figure 5B:
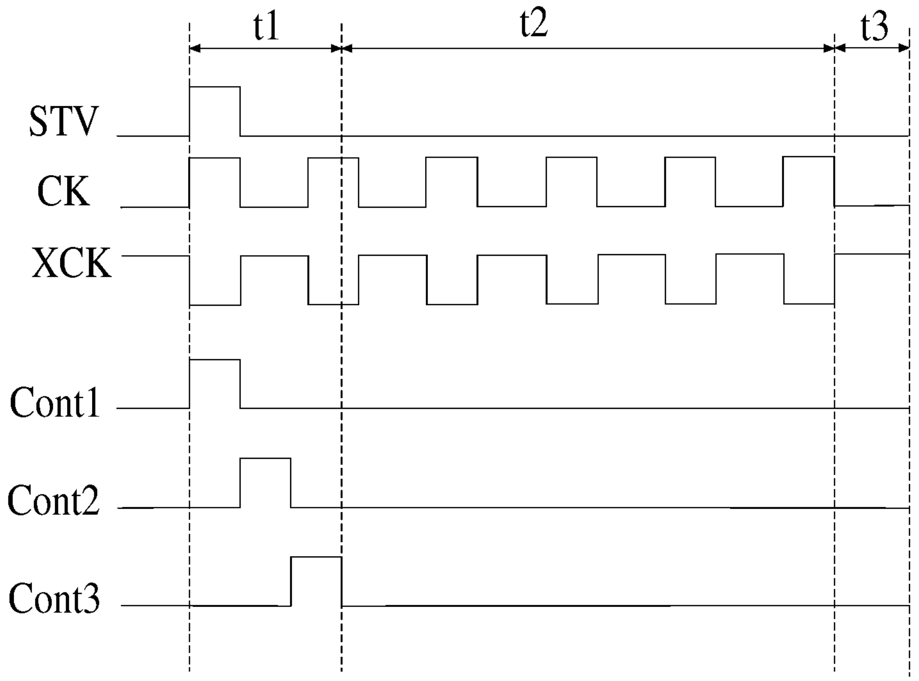
FIG. 5*b* is another second driving timing diagrams of the display panel provided in the embodiments of the present application.

Refer to FIGS. 5*a* and 5*b*, in the display panel provided in the present application, a plurality of the pre-charging control modules 10 disposed in different gate driving unit groups 30 are sequentially turned on under the control of a plurality of the pre-charging control signals Cont (1, 2, 3 . . . ) outputted from a plurality of the pre-charging control signal terminals Cont. As an example, FIG. 5 illustrates that a plurality of the gate driving units disposed in the first gate driving unit group 30 are simultaneously turned on under the control of the pre-charging control signals Cont1, and then a plurality of the gate driving units of the second gate driving unit group 30 are simultaneously turned on under the control of the pre-charging control signals Cont2. Specifically, those skilled in the art may divide the gate driving units into different number of gate drive unit groups according to the actual needs, and the present application does not specifically limit the number of gate drive unit groups herein.

In the embodiments of the present application, as shown in FIG. 5*b*, a plurality of the gate driving units are divided into M gate drive unit groups 30, wherein M is a positive integer greater than or equal to 3. Specifically, when M is a positive integer of 3, a plurality of the pre-charging control modules 10 corresponding to a plurality of the gate driving units disposed in the three gate driving unit groups 30 are turned on in sequence, that is, the time of a plurality of the pre-charging control modules 10 corresponding to the plural gate driving units disposed in different gate driving unit groups 30 being turned on are different. A plurality of the gate driving unit groups 30 which are simultaneously turned on are arranged continuously. Specifically, a plurality of the pre-charging control modules 10 corresponding to a plurality of the gate driving units disposed in a gate driving unit group 30 are electrically connected with the same pre-charging control signal terminal Cont, so that the time of a plurality of the pre-charging control modules 10 corresponding to a plurality of the gate driving units disposed in a gate driving unit group 30 being turned on are the same, and the time of duration of a plurality of the pre-charging control modules 10 corresponding to a plurality of the gate driving units disposed in a gate driving unit group 30 being turned on are the same. Specifically, the time of duration of the plurality of pre-charging control modules 10 corresponding to one gate driving unit group 30 being turned on is equal to the scanning time of scanning lines G (1, 2, 3 . . . ) G electrically connected with gate driving units, thereby reducing the loading of the pre-charging control signal terminal Cont, ensuring the stability of the pre-charging voltage outputted by the plurality of pre-charging control modules 10 disposed in each gate driving unit group 30, and further ensuring the pre-charging effect, reducing the response time of the liquid crystal, and improving the display quality.

It should be noted that, the pre-charging control modules 10 corresponding to a plurality of the gate drive units disposed in a part of gate drive unit groups 30 of the M gate drive unit groups 30 are turned on at the pre-charging phase t1, and the pre-charging control modules 10 corresponding to a plurality of the gate drive units disposed in the other gate drive unit groups 30 are turned off at the pre-charging phase t1. A plurality of the pre-charging control modules 10 turned on in the pre-charging phase t1 are disposed in a plurality of the gate driving unit groups 30, a plurality of the gate driving unit groups 30 are disposed continuously. That is, in the display panel provided in the present application, by providing a pre-charging control module 10 in a gate driving unit, and dividing a plurality of the gate driving units into M gate driving unit groups 30, and further turning on the pre-charging control modules 10 corresponding to a plurality of the gate driving units disposed in a part of the gate driving unit group 30 or all of the gate driving unit group 30 in the pre-charging phase t1, and turning off the pre-charging control modules 10 corresponding to a plurality of the gate driving units disposed in the other gate driving unit group 30 in the pre-charging phase t1, to buffer the grayscale value changes between two adjacent sub-frame images, the difference between the grayscale value of the previous sub-frame image and the grayscale value of the next sub-frame image can be minimized, and the response time of liquid crystal shifting caused by sub-frame images switching can be reduced and the display quality can be improved.

Figure 6:
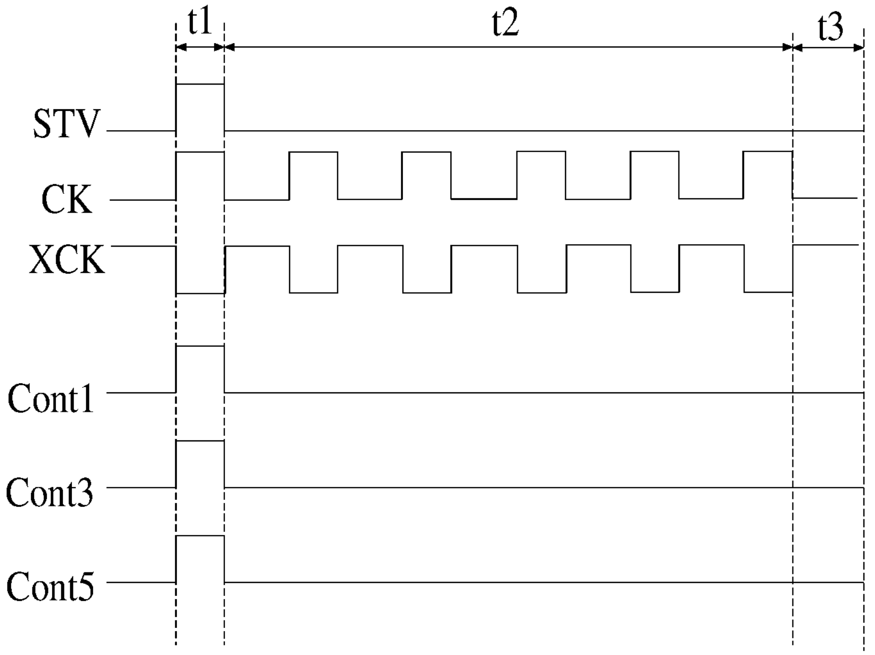
FIG. 6 is a third driving timing diagram of the display panel provided in the embodiments of the present application.
Figure 7:
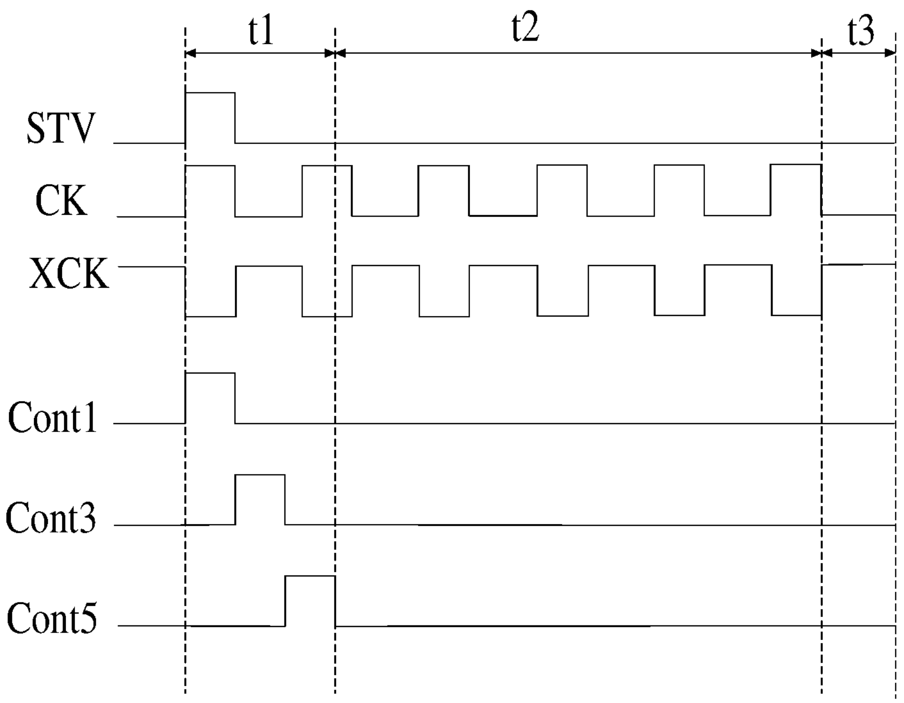
FIG. 7 is a fourth driving timing diagram of the display panel provided in the embodiments of the present application.
Figure 8:
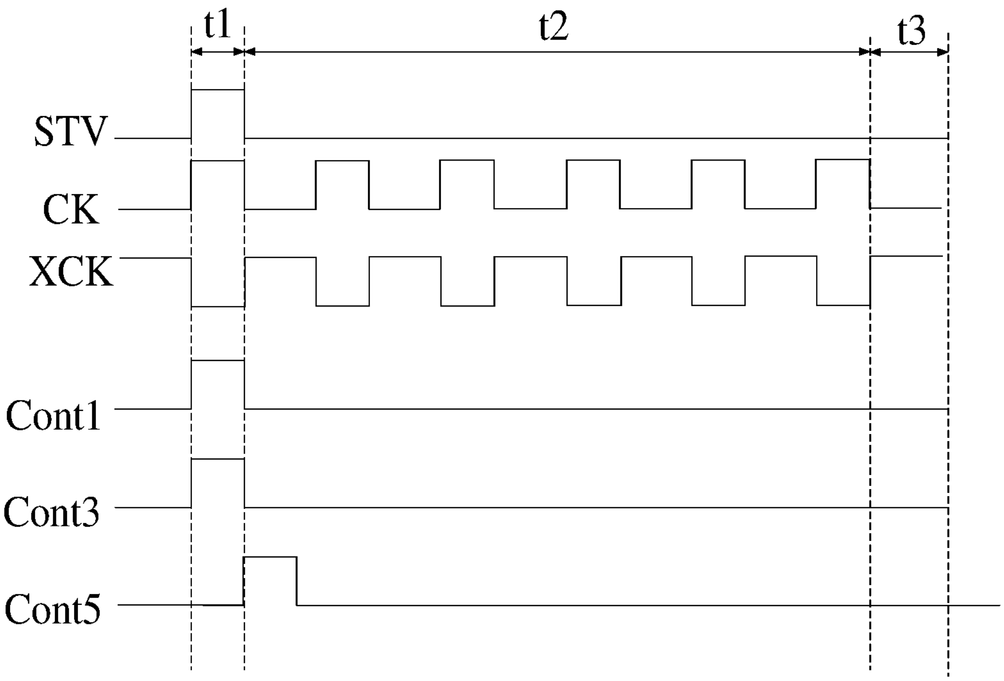
FIG. 8 is a fifth driving timing diagram of the display panel provided in the embodiments of the present application.

Refer to FIGS. 6 to 8, in the display panel provided in the present application, a plurality of the pre-charging control modules 10 disposed in at least two gate driving unit groups 30 arranged at intervals are simultaneously turned on under the control of pre-charging control signals Cont outputted from a pre-charging control signal terminal Cont, and/or, a plurality of the pre-charging control modules 10 disposed in at least two gate driving unit groups 30 arranged at intervals are sequentially turned on under the control of the pre-charging control signals Cont outputted from pre-charging control signal terminals Cont.

In the embodiments of the present application, a plurality of the gate driving units are divided into M gate drive unit groups 30, wherein M is a positive integer greater than or equal to 5. Specifically, when M is equal to 5, as shown in FIG. 6, a plurality of the pre-charging control modules 10 disposed in the three gate driving unit groups 30 arranged at intervals are simultaneously turned on under the control of the pre-charging control signals Cont (1, 3, 5 . . . ) outputted from the pre-charging control signal terminal Cont. That is, the time of a plurality of the pre-charging control modules 10 disposed in the three gate driving unit groups 30 being turned on are the same. With this design, the time of duration of pre-charging phase t1 is the shortest, and the impact on the time of duration of display phase t2 is the weakest, thereby reducing the response time of liquid crystal and ensuring the display time, and further improving the display quality.

In the embodiments of the present application, as shown in FIG. 7, the pre-charging control modules 10 disposed in the three gate driving unit groups 30 arranged at intervals are sequentially turned on under the control of the pre-charging control signals Cont (1, 3, 5 . . . ) outputted from the pre-charging control signal terminal Cont, that is, the time of the pre-charging control modules 10 disposed in the three gate driving unit groups 30 being turned on are different. With this design, the loading of the pre-charging control signal terminal Cont is reduced, the stability of the pre-charging voltage outputted by a plurality of the pre-charging control modules 10 disposed in each gate driving unit group 30 is ensured, thereby ensuring the pre-charging effect, reducing the response time of the liquid crystal and improving the display quality.

In the embodiments of the present application, as shown in FIG. 8, the pre-charging control modules 10 disposed in two of three gate driving unit groups 30 arranged at intervals are simultaneously turned on under the control of the pre-charging control signals Cont (1, 3, . . . ) outputted from the pre-charging control signal terminal Cont, and the pre-charging control modules 10 disposed in the other two of three gate driving unit groups 30 arranged at intervals are sequentially turned on under the control of the pre-charging control signals Cont (3, 5 . . . ) outputted from the pre-charging control signal terminal Cont. It should be noted that, the time of duration of the pre-charging control signals Cont outputted by the pre-charging control module 10 corresponding to the plurality of gate driving units disposed in the plurality of gate driving unit groups 30 can also be different. Specifically, the time of duration can be determined according to the difference between the grayscale values of the previous sub-frame image and the grayscale values of the next sub-frame image. If the grayscale value difference between the two sub-frame images is larger, the time of duration of the pre-charging control signals Cont outputted by the pre-charging control module 10 is longer, and vice versa is shorter, thereby reducing the response time of liquid crystal shifting caused by sub-frame images switching, and improving the display quality.

Figure 9:
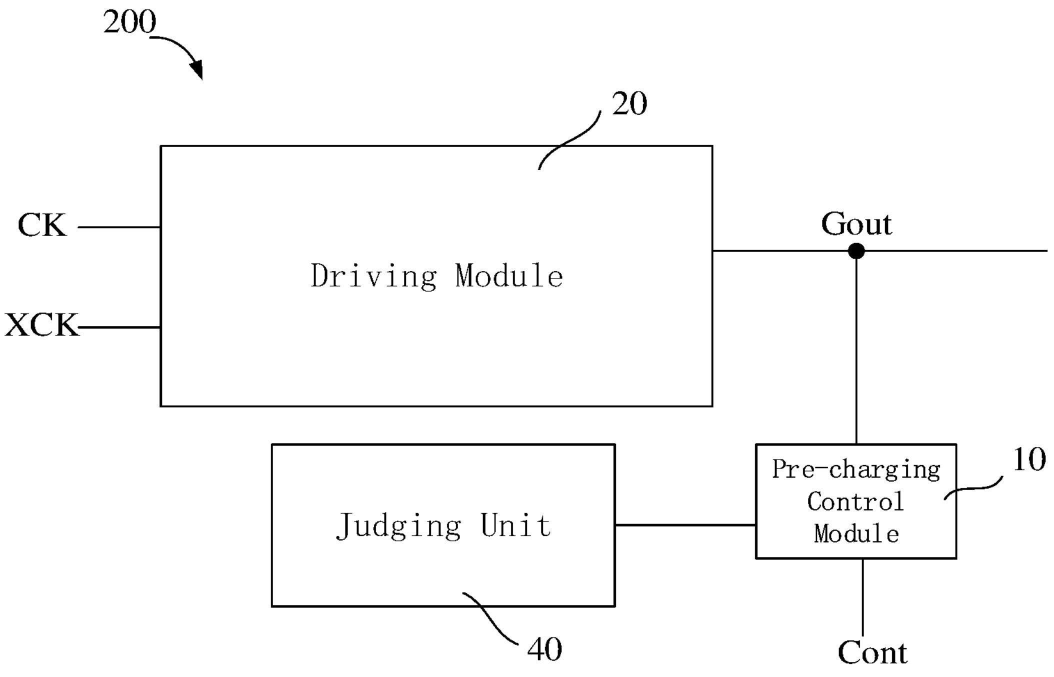
FIG. 9 is a schematic diagram of a second structure of the gate driving unit of the display panel provided in the embodiments of the present application.

Refer to FIG. 9, compared with the display panel 100, the display panel 200 provided in the present application further includes a judging unit 40 electrically connected with the pre-charging control module 10. The judging unit 40 is configured to turn on or turn off the pre-charging control module 10 according to the difference of the driving voltages of the scanning signal output terminal Gout of the present stage outputted from the corresponding gate driving units disposed in the adjacent two gate driving unit groups 30.

In the embodiments of the present application, if the grayscale values of the adjacent sub-frame images are changing greatly, such as the black-and-white images switching, the difference between the driving voltages outputted by the gate driving units disposed in the adjacent two gate driving unit groups 30 corresponding to the sub-frame images to the corresponding scanning signal output terminal Gout of the present stage is large. Then, in the pre-charging phase t1, a plurality of the pre-charging control modules 10 disposed in the gate driving unit group 30 corresponding to adjacent sub-frames are turned on under the control of the pre-charging control signals Cont outputted from a pre-charging control signal terminal Cont, and output the pre-charging control signals Cont to the scanning signal output terminal Gout of the present stage, to buffer the grayscale value changes between adjacent sub-frame images, thereby minimizing the difference between the grayscale values of the previous sub-frame image and the grayscale values of the next sub-frame image, and further reducing the response time of liquid crystal shifting caused by sub-frame images switching and improving the display quality. On the contrary, if the grayscale values between adjacent sub-frame images changes little or the image is still, the pre-charging control modules 10 are turned off, that is, the pre-charging control signals Cont are not outputted.

The present application also provides a driving method for driving the display panel as described above, a frame driving period includes a pre-charging phase t1, a display phase t2, and a blanking phase t3.

In the pre-charging phase t1, the pre-charging control module 10 is turned on and outputs the pre-charging control signals Cont to the scanning signal output terminal Gout.

In the embodiments of the present application, the display panel includes a plurality of data lines D (1, 2, 3 . . . ), a plurality of pixel units P, and a plurality of gate driving units connected in cascade. The gate driving unit includes a pre-charging control module 10 and a driving module 20. The pre-charging control module 10 is electrically connected with the pre-charging control signal terminal Cont and the scanning signal output terminal Gout of the present stage, the pre-charging control module 10 is configured to output the pre-charging control signals Cont to the scanning signal output terminal Gout of the present stage. The driving module 20 is electrically connected with the cascade control signal terminals CK/XCK/STV, the pre-charging control module 10 and the scanning signal output terminal Gout of the present stage. The driving module 20 is configured to output the driving signals to the scanning signal output terminal Gout of the present stage and the gate driving unit of the subsequent stage after the data lines D (1, 2, 3 . . . )

complete the output of the pre-charging voltages. Then the data lines D (1, 2, 3 . . . ) output data voltages to the corresponding pixel units P.

In the embodiments of the present application, a frame image includes a plurality of sub-frame images, such as red sub-frame images, green sub-frame images and blue sub-frame images. The pre-charging phase t1 is arranged before the display phase t2. The pre-charging control module 10 is configured to output the pre-charging control signals Cont to the scanning signal output terminal Gout of the present stage in the pre-charging phase t1 to buffer the grayscale value changes between two adjacent sub-frame images, thereby minimizing the difference between the grayscale values of the previous sub-frame image and the grayscale values of the next sub-frame image, and further reducing the response time of liquid crystal shifting caused by sub-frame images switching and improving the display quality.

In the embodiments of the present application, a plurality of the gate driving units connected in cascade are divided into a plurality of the gate driving unit groups 30. The gate driving unit includes a pre-charging control module 10. A plurality of the pre-charging control modules 10 disposed in the same gate driving unit group 30 are electrically connected with a same pre-charging control signal terminal Cont. The time of a plurality of the pre-charging control modules 10 disposed in the same gate driving unit group 30 being turned on are the same, and the time of duration of a plurality of the pre-charging control modules 10 disposed in the same gate driving unit group 30 being turned on are the same.

In the embodiments of the present application, preferably, the time of duration of a plurality of the pre-charging control modules 10 disposed in different gate driving unit groups 30 outputting the pre-charging control signals Cont to the corresponding scanning signal output terminal Gout are the same. A plurality of the pre-charging control modules 10 disposed in different gate driving unit groups 30 are simultaneously turned on or sequentially turned on under the control of the pre-charging control signals Cont outputted from a pre-charging control signal terminal Cont. A plurality of the gate driving unit groups 30 are arranged continuously or arranged at intervals.

In the display phase t2, the driving module 20 is turned on under the control of the cascade control signals CK/XCK/STV outputted from the cascade control signal terminals CK/XCK/STV, the pre-charging control module 10 is turned off, and the driving module 20 outputs driving signals to the scanning signal output terminal Gout of the present stage and the gate driving unit of the subsequent stage.

An image with fixed grayscale values is arranged in the blanking phase t3, such as the phase between two frames of image, to accelerate the speed of the liquid crystal reaching a preset state.

On the other hand, the present application provides a display device including the display panel as described above. The display device further includes a driving circuit disposed in the display panel, the driving circuit is configured to drive the display panel.

In the display panel and the display device provided in the embodiments of the present application, the display panel includes a plurality of data lines D (1, 2, 3 . . . ), a plurality of pixel units P, and a plurality of gate driving units connected in cascade. A plurality of the pixel units P are electrically connected with the data lines D (1, 2, 3 . . . ). At least one gate driving unit includes a pre-charging control module, the pre-charging control module is electrically connected with a pre-charging control signal terminal and a scanning signal output terminal of the present stage. The pre-charging control module outputs pre-charging control signals to the scanning signal output terminal of the present stage, and the data lines D (1, 2, 3 . . . ) output pre-charging control signals Cont to the corresponding pixel units P. By providing the pre-charging control module to output the pre-charging control signals to the scanning signal output terminal of the present stage, pre-charging the pixel units P corresponding to at least one the gate driving unit before images displaying can be realized, thereby reducing the response time of the liquid crystal and improving the problem of abnormal color mixing of image displayed with field sequence display method.

A display panel and a display device provided in the embodiments of the present application are described in detail above. The principle and implementation method of the present application are described with specific embodiments herein. The above embodiments are for understanding the method and the core idea of the present application only. Those skilled in the art can make changes in the specific implementation method and application scope according to the idea of the present application. The description of the present specification should not be considered as a limitation to the present application.

What is claimed is:

1. A display panel, comprising:

a plurality of data lines;

a plurality of pixel units electrically connected with the data lines; and a plurality of gate driving units connected in cascaded stages;

wherein at least one of the gate driving units comprises a pre-charging control module, the pre-charging control module is electrically connected with a pre-charging control signal terminal and a scanning signal output terminal of a present stage, the pre-charging control module is configured to output an pre-charging control signal to the scanning signal output terminal of the present stage; and the data lines are configured to output the pre-charging control signal to corresponding ones of the pixel units;

wherein the plurality of the gate driving units are divided into a plurality of gate driving unit groups, each of the gate driving units in each of the gate driving unit groups comprises the pre-charging control module, and a plurality of pre-charging control modules disposed in each of the gate driving unit groups are electrically connected with a same one pre-charging control signal terminal; and wherein a plurality of pre-charging control modules disposed in at least two of the gate driving unit groups arranged at intervals are simultaneously turned on under controls of pre-charging control signals outputted from pre-charging control signal terminals.

2. The display panel according to claim 1, wherein a plurality of pre-charging control modules disposed in different ones of the gate driving unit groups are simultaneously turned on under controls of the pre-charging control signals outputted from the pre-charging control signal terminals.

3. The display panel according to claim 1, wherein ones of the pixel units corresponding to different ones of the gate driving unit groups are pre-charged for the same time period.

4. The display panel according to claim 1, wherein each of the gate driving units further comprises a driving module, the driving module is electrically connected with a cascade control signal terminal, the pre-charging control module, and the scanning signal output terminal of the present stage; the driving module is configured to output a driving signal to the scanning signal output terminal of the present stage and one of the gate driving units of a subsequent stage after the data lines complete the output of a pre-charging voltage, and the data lines are configured to output data voltages to the pixel units.

5. The display panel according to claim 4, wherein a peak value of the pre-charging voltage ranges between 50% and 90% of a peak value of the data voltages.

6. The display panel according to claim 4, wherein the display panel further comprises a judging unit electrically connected with the pre-charging control module and the data lines; the judging unit is configured to control the pre-charging control module to turn off when a difference value between the data voltages outputted from the data lines to the pixel units corresponding to two adjacent ones of the gate driving unit groups is less than or equal to a predetermined threshold value, and configured to control the pre-charging control module to turn on when the difference value between the data voltages outputted from the data lines to the pixel units corresponding to the two adjacent ones of the gate driving unit groups is greater than the predetermined threshold value.

7. The display panel according to claim 1, wherein the plurality of the gate driving units connected in the cascaded stages comprise N gate driving unit groups;

where X≤K≤X*N, and K≤T*30%, X is a scanning period of one row of pixel units in the plurality of pixel units, K is a total pre-charging period corresponding to a plurality of the gate driving unit groups, T is a display period of one frame of image, N is a positive integer, and X, K, and T are positive numbers.

8. The display panel according to claim 1, further comprising a plurality of sub-backlight regions disposed along a direction of the scanning line and disposed corresponding to the gate driving unit groups, wherein pre-charging voltages for the pixel units corresponding to the sub-backlight regions are negatively correlated with the brightness of the sub-backlight regions.

9. A display device, comprising:

a display panel; and a driving circuit disposed on the display panel, wherein the display panel comprises:

a plurality of data lines;

a plurality of pixel units electrically connected with the data lines; and a plurality of gate driving units connected in cascaded stages;

wherein at least one of the gate driving units comprises a pre-charging control module, the pre-charging control module is electrically connected with a pre-charging control signal terminal and a scanning signal output terminal of a present stage, the pre-charging control module is configured to output an pre-charging control signal to the scanning signal output terminal of the present stage; and the data lines are configured to output the pre-charging control signal to corresponding ones of the pixel units;

wherein the plurality of the gate driving units are divided into a plurality of gate driving unit groups, each of the gate driving units in each of the gate driving unit groups comprises the pre-charging control module, and a plurality of pre-charging control modules disposed in each of the gate driving unit groups are electrically connected with a same one pre-charging control signal terminal; and wherein a plurality of pre-charging control modules disposed in at least two of the gate driving unit groups arranged at intervals are simultaneously turned on under controls of pre-charging control signals outputted from pre-charging control signal terminals.

10. The display device according to claim 9, wherein a plurality of pre-charging control modules disposed in different ones of the gate driving unit groups are simultaneously turned on under controls of the pre-charging control signals outputted from the pre-charging control signal terminals.

11. The display device according to claim 9, wherein ones of the pixel units corresponding to different ones of the gate driving unit groups are pre-charged for the same time period.

12. The display device according to claim 9, wherein each of the gate driving units further comprises a driving module, the driving module is electrically connected with a cascade control signal terminal, the pre-charging control module, and the scanning signal output terminal of the present stage; the driving module is configured to output a driving signal to the scanning signal output terminal of the present stage and one of the gate driving units of a subsequent stage after the data lines complete the output of a pre-charging voltage, and the data lines are configured to output data voltages to the pixel units.

13. The display device according to claim 12, wherein a peak value of the pre-charging voltage ranges between 50% and 90% of a peak value of the data voltages.

14. The display device according to claim 12, wherein the display panel further comprises a judging unit electrically connected with the pre-charging control module and the data lines; the judging unit is configured to control the pre-charging control module to turn off when a difference value between the data voltages outputted from the data lines to the pixel units corresponding to two adjacent ones of the gate driving unit groups is less than or equal to a predetermined threshold value, and configured to control the pre-charging control module to turn on when the difference value between the data voltages outputted from the data lines to the pixel units corresponding to the two adjacent ones of the gate driving unit groups is greater than the predetermined threshold value.

* * * * *